(12) United States Patent
Waltz et al.

(10) Patent No.: US 12,510,143 B2
(45) Date of Patent: Dec. 30, 2025

(54) ELECTRIC AXLE

(71) Applicant: Dana Heavy Vehicle Systems Group, LLC, Maumee, OH (US)

(72) Inventors: William F. Waltz, Toledo, OH (US); Darren J. Ziskovsky, Bowling Green, OH (US)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 0 days.

(21) Appl. No.: 18/784,584

(22) Filed: Jul. 25, 2024

(65) Prior Publication Data

US 2025/0035196 A1     Jan. 30, 2025

Related U.S. Application Data

(60) Provisional application No. 63/515,673, filed on Jul. 26, 2023.

(51) Int. Cl.
*B60K 17/02* (2006.01)
*B60K 1/00* (2006.01)
(Continued)

(52) U.S. Cl.
CPC ............ *F16H 37/082* (2013.01); *B60K 1/00* (2013.01); *B60K 17/02* (2013.01); *B60K 17/08* (2013.01); *B60K 17/165* (2013.01); *F16H 48/11* (2013.01); *F16H 48/20* (2013.01); *B60K 2001/001* (2013.01); *F16H 2200/0021* (2013.01);
(Continued)

(58) Field of Classification Search
CPC ...... F16H 2200/2005–2007; F16H 3/52–3/66; F16H 2200/2038; F16H 2200/2064; F16H 2200/2094; F16H 48/11; F16H 37/0813; F16H 37/082; B60K 17/02-356; B60K 1/00–02; B60K 2001/001
See application file for complete search history.

(56) References Cited

U.S. PATENT DOCUMENTS

| | | | |
|---|---|---|---|
| 7,011,596 B2 * | 3/2006 | Haka | F16H 3/58 475/285 |
| 8,961,350 B1 * | 2/2015 | Mellet | F16H 37/02 475/210 |

(Continued)

OTHER PUBLICATIONS

Waltz, W. et al., "Electric Axle," U.S. Appl. No. 18/784,452, filed Jul. 25, 2024, 44 pages.

(Continued)

*Primary Examiner* — Ernesto A Suarez
*Assistant Examiner* — Lillian T Nguyen
(74) *Attorney, Agent, or Firm* — McCoy Russell LLP

(57) ABSTRACT

Methods and systems are provided for an electric axle. The electric axle system includes, in one example, an electric machine and a multi-speed transmission that is rotationally coupled to the electric machine and rotationally coupled to two output shafts. The transmission includes a differential rotationally coupled and positioned coaxial to a mode planetary gear set. In the electric axle system, the mode planetary gear set is a meshed planet compound planetary gear set and a mode clutch in the transmission is configured to selectively shift the mode planetary gear set between a first mode and a second mode.

15 Claims, 9 Drawing Sheets

(51) Int. Cl.
  *B60K 17/08* (2006.01)
  *B60K 17/16* (2006.01)
  *F16H 37/08* (2006.01)
  *F16H 48/11* (2012.01)
  *F16H 48/20* (2012.01)
(52) U.S. Cl.
  CPC ............... *F16H 2200/0034* (2013.01); *F16H 2200/2005* (2013.01); *F16H 2200/2007* (2013.01)

(56) References Cited

U.S. PATENT DOCUMENTS

| | | | |
|---|---|---|---|
| 2009/0221393 A1* | 9/2009 | Kassler | F16H 48/10 475/205 |
| 2013/0041533 A1* | 2/2013 | Kim | B60K 6/445 180/65.265 |
| 2015/0367829 A1* | 12/2015 | Kodama | B60W 10/12 180/65.265 |
| 2019/0299766 A1* | 10/2019 | Takada | B60W 20/40 |
| 2019/0360558 A1* | 11/2019 | Eo | F16H 3/666 |
| 2020/0096083 A1* | 3/2020 | Waltz | B60K 1/02 |
| 2021/0164544 A1* | 6/2021 | Renner | F16H 3/663 |
| 2023/0060296 A1* | 3/2023 | Pfeffer | B60K 17/08 |

OTHER PUBLICATIONS

Waltz, W. et al., "Electric Axle," U.S. Appl. No. 18/784,584, filed Jul. 25, 2024, 37 pages.
Waltz, W. et al., "Electric Axle," U.S. Appl. No. 18/784,614, filed Jul. 25, 2024, 37 pages.

* cited by examiner

ELECTRIC AXLE

CROSS REFERENCE TO RELATED APPLICATION

The present application claims priority to U.S. Provisional Application No. 63/515,673, entitled "ELECTRIC AXLE", and filed on Jul. 26, 2023. The entire contents of the above-listed application are hereby incorporated by reference for all purposes.

TECHNICAL FIELD

The present description relates generally to an electric axle with two concentric planetary gear sets.

BACKGROUND AND SUMMARY

Electric axles have been used in a variety of vehicle platforms to fulfill the electrification needs of different vehicle sectors. These electric axles include traction motors and transmissions which may be mounted in different arrangements depending on the spatial constraints and end-use goals of the vehicle platform. Electric axles may be more capable of simplified and efficient vehicle platform integration when compared to electric drives with the traction motor, transmission, and drive axles designed as separate units.

At least some electric axles have fallen short of achieving end-use design goals in relation to space efficiency, shifting functionality, and power density. For instance, some multi-speed transmissions use a multitude of parallel shafts and gears that create packaging challenges. Further, in previous multi-speed transmissions, all of the gearing is meshed but in certain modes torque is only transmitted through a portion of the gears, leaving other gears unloaded. Therefore, the unloaded gears create unavoidable bearing, mesh, and windage losses. The inventors have therefore recognized a desire to reduce the packaging space and increase the power density of electric axles.

The issues described above may be addressed by an electric axle system. The electric axle system includes, in one example, an electric machine and a multi-speed transmission that is rotationally coupled to the electric machine and rotationally coupled to two output shafts. The multi-speed transmission includes a mode planetary gear set rotationally coupled and positioned coaxial to a differential. The multi-speed transmission further includes a mode clutch configured to selectively transition the multi-speed transmission between a first mode and a second mode. In one example, in the electric axle system, the mode planetary gear set is a meshed planet compound planetary gear set. In this way, the mode planetary gear set effectively achieves two gear ratio modes in a space efficient package, expanding the system's speed change capabilities.

In one example, the differential is a differential meshed planet compound planetary gear set. In this way, a space efficient electric axle with a desired power density is achieved. To elaborate, the use of the differential meshed planet compound planetary gear set and the mode planetary gear set in this configuration allows the electric axle to forgo the use of additional shafts (e.g., layshafts with idling gears), if desired, while achieving a desired number of gear modes and ratios of the modes. Consequently, customer appeal is increased.

In one example, the electric axle system further includes a differential locking clutch that is configured to selectively rotationally couple a ring gear in the differential to a carrier in the differential to lock rotation of the two output shafts. Further in one example, the electric axle additionally includes an axle disconnect clutch that is configured to selectively disconnect the mode planetary gear set from the differential. In this way, the electric axle's functionality is expanded to exhibit differential locking and axle disconnect capabilities, further increasing customer appeal.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1A:
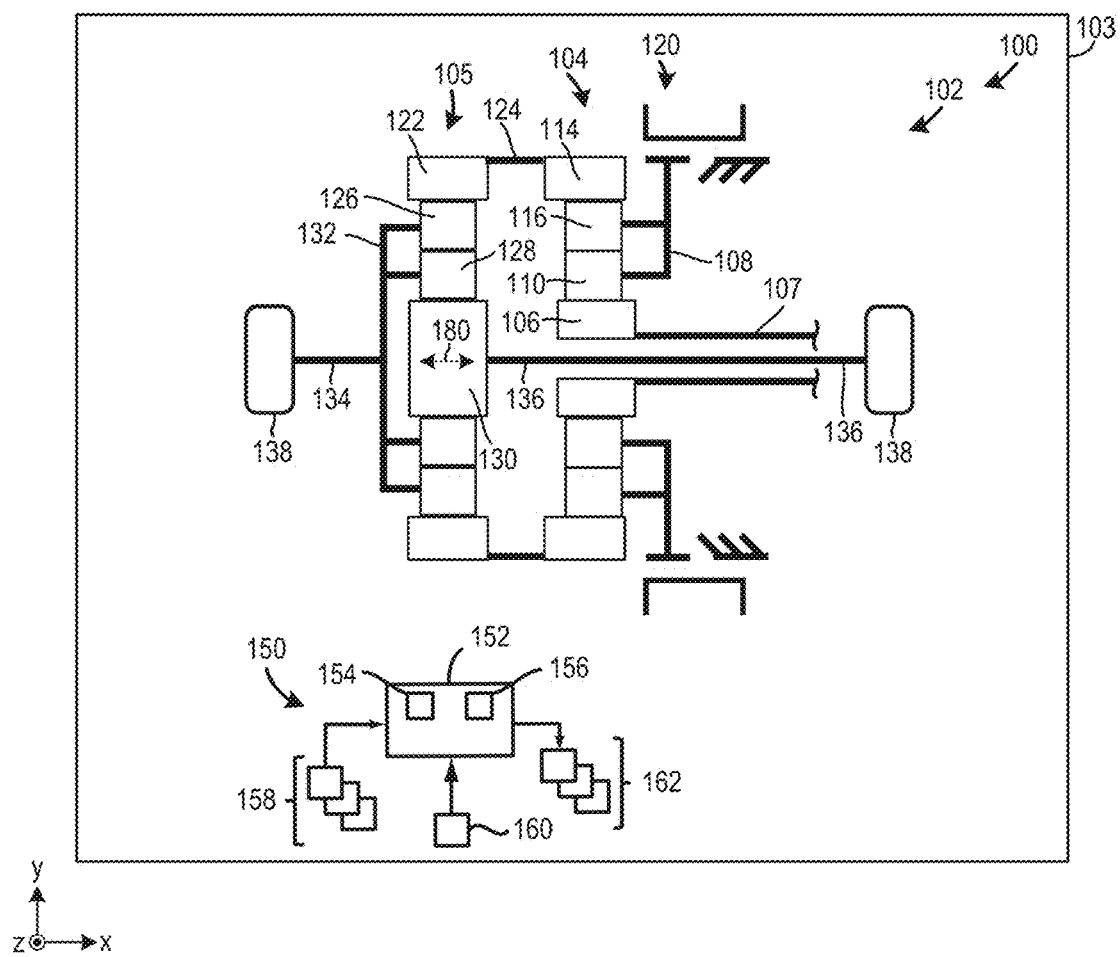
FIGS. 1A-1B show an example of an electric axle with a differential meshed planet compound planetary gear set, a mode planetary gear set, and a mode clutch.

A differentiating multi-speed electric axle with mode select functionality that achieves increased compactness and power density is described herein. Previous multi-speed electric axles have made use of multiple parallel shafts that present packaging challenges. For instance, some multi-speed electric axles use two shafts dedicated to gear shifting, at a minimum. In these electric axles all of the gearing is meshed but in certain modes torque is only transmitted through a portion of the gears, leaving other gears unloaded. Therefore, the unloaded gears create unavoidable bearing, mesh, and windage losses. Further, differentials which employ spider gears are comparatively wide and may present axial packaging challenges in certain vehicles, thereby constraining the differential's applicability. Certain planetary differentials such as compound planetary differentials with two output sun gears or two output ring gears, two concentric simple planetary gear sets side by side, and two nested concentric planetary gear sets may also present challenges with regard to axial length and/or overall diameter of the drive axle. However, the aforementioned types of planetary gear sets may be used in any of the electric axles described herein.

As described herein a simple planetary gear set is a planetary gear set with solely a ring gear, a sun gear, a carrier, and multiple planet gears that are in the same plane as the ring gear and the sun gear and rotate on the carrier. Each planet gear meshingly engages both the sun gear and the ring gear. Further, as described herein a meshed planet compound planetary gear set is a planetary gear set with a ring gear, a sun gear, and multiple sets of planet gears in mesh in the plane of the ring gear and sun gear and circumferentially aligned in the same plane as the ring and the sun gears. The planet sets include an inner planet gear and an outer planet gear. The inner planet gear is meshingly engaged with the sun gear and an outer planet gear. The outer planet gear is meshingly engaged with an inner planet gear and the ring gear.

To achieve the space efficiency and power density targets, the electric axle includes, in one example, a transmission that has a multi-speed mode selection planetary gear set and a compact planetary differential in a coaxial package. To elaborate, the multi-speed gear set in the transmission includes a mode planetary gear set with a mode clutch for shifting between the gear modes.

In one example, the electric axle includes a differential planetary gear set and a mode planetary gear set that are concentric with the electric axle's output axis. Further, the differential in the electric axle may be formed of a compound planetary gear set with meshed planet gears. The use of the mode and differential planetary gear sets allows multiple shafts used for gear shifting to be omitted from the system, if desired. Consequently, packaging efficiency is increased, the width of the differential is reduced, and the overall axial length of the electric axle is reduced, if desired, thereby allowing a more compact and power dense electric axle architecture to be achieved. Unlike previous multi-speed electric axles with idling gears on layshafts, all the gears in the multi-speed electric axle may transmit torque. To elaborate, there may be no idling gear passes in the system that create bearing, mesh, and windage losses while in an adjacent speed mode. Consequently, transmission efficiency is increased.

When the differentiating multi-speed (e.g., two speed) electric axle is in a lower mode, there is relative speed between the elements of the mode planetary gear set. In the higher mode, the mode planetary gear set may be locked up and rotate as one. The differential planetary gear set may also rotate as one and differentiates solely when the vehicle is turning. In practice, the transmission may likely be operated in the higher mode to a greater extent of its operational life than the lower mode (e.g., the majority of the time). In the higher mode the planetary gear sets rotate as one. With no relative component rotation within the differential planetary gear set and no relative component rotation within the mode planetary gear set, gear mesh noise will decrease, gear tooth wear will decrease, component lifespan will increase, frictional losses will decrease, and windage losses will decrease, thereby increasing the axle's overall efficiency. With increased life and a multiple array of planet gear pairs, there is the opportunity to decrease the width of the differential planetary gear set and mode planetary gear set, thereby reducing the electric axle's axial length, if desired. Also, in certain end-use operational scenarios, the electric axle may be operated in the higher mode for a longer duration than the lower modes and with no relative speed with the meshed planet pairs, there may be the opportunity to use spur gears in the planetary gear sets, further reducing the electric axle's cost and complexity as well as simplifying component manufacturing of the differential planetary gear set and the mode planetary gear set.

The layouts of the differentiating multi-speed electric axle described herein allow for an axle disconnect, and differential lock features to be easily and effectively incorporated into the axle, if desired. Consequently, the electric axles are able to achieve added features that may be difficult to package on other axle architectures, such as a parallel axis differential design. Further, it will be appreciated that the electric axles described herein may be designed with the electric motor arranged concentric to the output axis, coaxial to the output axis, parallel to the output axis, at 90° to the output axis, or at other suitable angles with regard to the output axis.

FIG. 1A shows an example of an electric axle 100 with a transmission 102 that includes a mode planetary gear set 104. The electric axle 100 further includes a differential meshed planet compound planetary gear set 105, in the illustrated example. The mode planetary gear set 104 and the differential meshed planet compound planetary gear set 105 are discussed in greater detail herein.

The electric axle 100 is included in an electric vehicle (EV) 103, in the illustrated example. It will be understood that the other electric axles described herein may also be included in a similar EV. The EV 103 may be an all-electric vehicle (e.g., battery electric vehicle (BEV)), in one example, or a hybrid electric vehicle, in another example. As such, vehicles that utilize the electric axles described herein may also have an internal combustion engine (e.g., a spark ignition engine, a compression ignition engine, combinations thereof, and the like), in some examples. Thus, the electric axles described herein may be used in cars, trucks, all-terrain vehicles (ATVs), commercial vehicles, light vehicles, off-highway vehicles, mining vehicles, rail vehicles, manufacturing machinery, industrial machinery, and the like.

Further, the mode planetary gear set 104 is a meshed planet compound planetary gear set, in the illustrated example. To expound, the mode planetary gear set 104 comprises two sets of planetary gears 110 and 116 where the planetary gears mesh with one another, in the illustrated example. Further the planetary gears in the set of planetary gears 110 mesh with a sun gear 106 and the planetary gears in the set of planetary gears 116 mesh with a ring gear 114. However, the mode planetary gear set may have a greater number of planetary gear sets and/or a different gear architecture, in other examples. The sets of planetary gears 110 and 116 are rotatably mounted on a carrier 108. Further, an input shaft 107 is connected to the sun gear 106, in the illustrated example. It will be understood that the input shaft 107 may be coupled to a traction motor via shafts, gear passes, chains, belts, combinations thereof, and the like. Different exemplary layouts for the motor and associated components which connect the motor to the transmission are expanded upon herein with regard to FIGS. 2-3D.

The mode planetary gear set 104 may be specifically configured to shift between two modes. However, electric axles with a greater number of speeds, such as a three speed electric axle, a four speed electric axle, etc., have been contemplated. To enable the multi-speed functionality of the transmission, a mode clutch 120 is provided in the transmission. The mode clutch 120 is configured to ground the carrier 108 in a first mode, and rotationally couple the carrier 108 and the ring gear 114 in a second mode. The mode clutch 120 is in the first mode in the illustrated example.

However, the mode clutch 120 may be switched into the different modes based on operating conditions of the electric axle and/or vehicle. Further, the first mode has a higher gear ratio than the second mode. The specific gear ratios associated with the modes may be selected based on factors such as electric motor type and performance characteristics, vehicle weight, vehicle performance targets, and the like.

The mode clutch 120 may be a dog clutch, a synchronizer, a friction clutch (e.g., a wet friction clutch), a radial clutch, a face clutch, a curvic clutch, a magnetic clutch, combinations thereof, and the like. The other clutches described herein may also be any of the aforementioned types or combinations of clutch types. Further, the mode clutch 120 as well as the other clutches described herein may be actuated via electro-mechanic actuators, pneumatic actuators, hydraulic actuators, electro-magnetic actuators, barrel cam actuators, combinations thereof, and the like. Shift forks, such as translational or rotational shift forks, may specifically be used to actuate at least a portion of the clutches described herein.

The differential meshed planet compound planetary gear set 105 is rotationally coupled to the mode planetary gear set 104. To expound, the ring gear 114 in the mode planetary gear set 104 is coupled to a ring gear 122 in the differential meshed planet compound planetary gear set 105 via a shaft 124 and/or other suitable mechanical component. Attaching the differential meshed planet compound planetary gear set and the mode planetary gear set in this manner allows the transmission to achieve a compact arrangement and a desired gear ratio.

The differential meshed planet compound planetary gear set 105 further includes a set of planetary gears 126, a set of planetary gears 128, and a sun gear 130. A carrier 132 is further included in the differential meshed planet compound planetary gear set 105 that has the set of planetary gears 126 and the set of planetary gears 128 rotatably mounted thereto. In the illustrated example, an output shaft 134 (e.g., an axle shaft such as a half shaft) is coupled to the carrier 132 and another output shaft 136 is coupled to the sun gear 130. In turn, the output shafts 134 and 136 are rotationally coupled to drive wheels 138, in the illustrated example. However, in other examples, the output shafts 134 and 136 may be coupled to wheel end gear reductions and/or other suitable mechanical components.

In the electric axle 100 depicted in FIG. 1A, the carrier 132 and the sun gear 130 of the differential meshed planet compound planetary gear set 105 function as the differential's outputs and the sun gear 106 of the mode planetary gear set functions as the electric axle's input. However, differentials with different output configurations may be used in the electric axle, as discussed in greater detail herein with regard to FIGS. 8, 10, and 11.

The mode planetary gear set 104 and the differential meshed planet compound planetary gear set 105 are concentric with the electric axle's output rotational axis, in the illustrated example. In this way, axle compactness is increased when compared to axles with non-concentric arrangement. A rotational axis 180 of the differential meshed planet compound planetary gear set 105, is provided in FIG. 1A, for reference. It will be understood, that the rotational axis of the input of the mode planetary gear set 104 and the rotational axes of the output shafts 134 and 136 are arranged coaxial to the rotational axis 180.

The use of the mode planetary gear set 104 and the differential meshed planet compound planetary gear set 105 may allow additional shafts and shifting gears to be omitted from the transmission (if desired), reduces packaging, decreases transmission width, and reduces the overall axial length allowing for a more compact and power dense electric axle design, if desired. In this way, transmission efficiency is increased.

As discussed above, when the mode planetary gear set 104 is operated in the lower mode, there is relative speed between the elements of the multi-speed mode planetary gear set. In the higher mode, the mode planetary gear set is locked up and rotates as one. The differential may also typically rotate as one and solely differentiates while the vehicle is turning. The majority of the electric axle's operation life may be in the highest mode, in certain end-use platforms, thereby decreasing component wear, decreasing windage losses, and increasing electric axle efficiency.

A coordinate axis system is provided in FIG. 1A, as well as FIGS. 2-11, for reference and to orient the views, when appropriate. The z-axis may be a vertical axis (e.g., parallel to a gravitational axis), the x-axis may be a lateral axis (e.g., horizontal axis), and the y-axis may be a longitudinal axis, in one example. However, in other examples, the axes may have other orientations. The rotational axis 180 of the sun gear 130 is further provided for reference in FIG. 1A, as previously indicated. The mode planetary gear set 104 and the differential meshed planet compound planetary gear set 105 are coaxially arranged, in the illustrated example. The other electric transmissions described herein also exhibit the coaxial arrangement between the mode planetary gear set and the differential. In this way, the electric transmission is able to achieve a desired space efficiency.

As shown in FIG. 1A, the EV 103 may further include a control system 150 with a controller 152. The controller 152 may include a microcomputer with components such as a processor 154 (e.g., a microprocessor unit), input/output ports, an electronic storage medium 156 for executable programs and calibration values (e.g., a read-only memory chip, random access memory, keep alive memory, a data bus, and the like). The storage medium may be programmed with computer readable data representing instructions which are executable by a processor for performing the methods, control techniques, and the like described herein as well as other variants that are anticipated but not specifically listed. Therefore, the electronic storage medium 156 may hold instructions stored therein that when executed by the processor 154 cause the controller 152 to perform the various method steps described herein.

The controller 152 may receive various signals from sensors 158 coupled to different regions of the EV 103 and specifically the electric axle 100. For example, the sensors 158 may include one or more motor speed sensors (elaborated upon below), shaft/gear speed sensors, thermocouples, pressure sensors, a pedal position sensor to detect a depression of an operator-actuated pedal (e.g., an accelerator pedal and/or a brake pedal), speed sensors at the vehicle wheels, and the like. An input device 160 (e.g., accelerator pedal, brake pedal, gear selector, combinations thereof, and the like) may further provide input signals indicative of an operator's intent for vehicle control.

Upon receiving the signals from the various sensors 158 of FIG. 1A, the controller 152 processes the received signals, and employs various actuators 162 of vehicle components to adjust the components based on the received signals and instructions stored on the memory of controller 152. For example, the controller 152 may receive an accelerator pedal signal indicative of an operator request for a vehicle acceleration adjustment. In response, the controller 152 may command operation of inverters which are electrically coupled to an electric machine which provides power to the mode planetary gear set to increase the power delivered from the motor to the transmission 102. The other controllable components in the vehicle may function in a similar manner with regard to sensor signals, control commands, and actuator adjustment, for example. Further, the control system 150 may be used in any of the electric axle systems and transmissions described herein.

The controller 152 may include instructions that when executed cause the mode clutch 120 to shift between the first mode and the second mode, also referred to as the lower mode and the higher mode, based on vehicle and axle operating conditions. For instance, the electric axle 100 may be operated in the first mode when the vehicle is traveling at lower vehicle speeds. When, the vehicle speed surpasses a first threshold, the mode clutch may shift to the second mode. This shifting sequence may also be implemented in the reverse order through the modes. The control system 150 described above may be used in any of the electric axles and transmissions described herein.

Figure 1B:
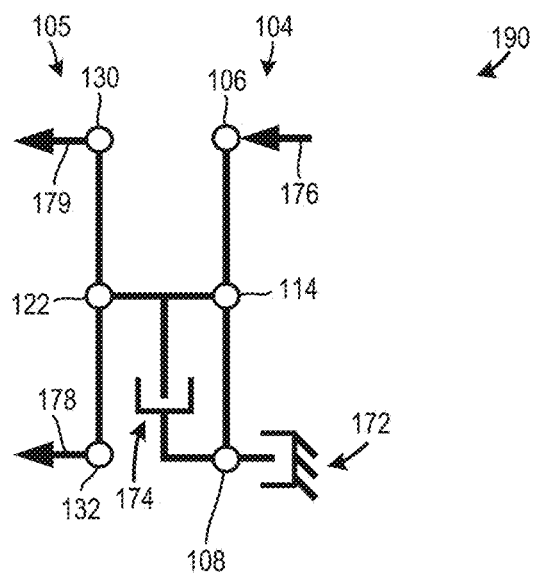

FIG. 1B shows a lever diagram 190 of the architecture of the electric axle 100, depicted in FIG. 1A. The two functions of the mode clutch 120, shown in FIG. 1A, which correspond to the first mode and the second mode are indicated via devices 172 and 174, respectively. However, it will be appreciated that the mode clutch 120 may be configured to perform the mode switching functionality as one clutch unit. As discussed above, in the first mode, the carrier 108 is grounded and in the second mode the carrier 108 and the ring gear 114 are rotationally coupled to one another. The input of the mode planetary gear set 104 is indicated via arrow 176 and the outputs of the differential meshed planet compound planetary gear set 105 are indicated via arrows 178 and 179. The rotational direction of the transmission's input is the same as the rotational directions of the transmission's outputs, in the illustrated example. However, other transmission designs are possible.

Figure 2:
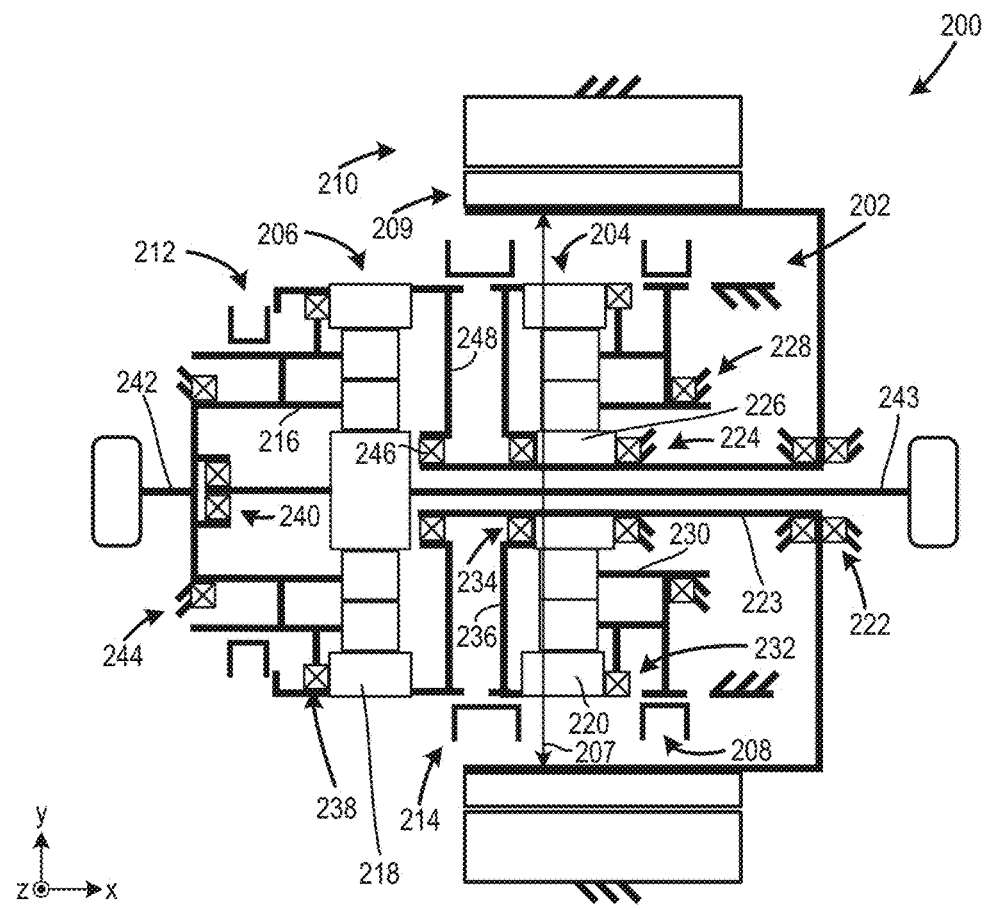
FIG. 2 shows an example of an electric axle system with a differential meshed planet compound planetary gear set, a mode planetary gear set, a mode clutch, a differential locking clutch, and an axle disconnect clutch.

FIG. 2 shows an electric axle 200 with a transmission 202 that includes a mode planetary gear set 204 and a differential meshed planet compound planetary gear set 206. The architectures of the mode planetary gear set 204 and the differential meshed planet compound planetary gear set 206 are similar to the mode planetary gear set 104 and the differential meshed planet compound planetary gear set 105, shown in FIG. 1A. The transmission 202 shown in FIG. 2 again includes a mode clutch 208 that allows the transmission to achieve multi-speed functionality, similar to the transmission 102, shown in FIG. 1A.

FIG. 2 specifically depicts an electric machine 210 in the electric axle 200. As described herein the electric machines associated with the electric axles may be traction motors (e.g., motor-generators). The electric machine 210 depicted in FIG. 2 is specifically arranged concentric to the differential meshed planet compound planetary gear set 206 and the mode planetary gear set 204. To elaborate, an inner diameter 207 of a rotor 209 of the electric machine 210 is shown circumferentially surrounding at least a portion the transmission and specifically the mode planetary gear set 204. However, as discussed in greater detail herein, the electric machine may have a variety of suitable positions and orientations. At least a portion of the meshed planet compound planetary gear sets are positioned in an interior opening of the electric machine, in the illustrated example.

FIG. 2 also depicts a differential locking clutch 212 and an axle disconnect clutch 214. The differential locking clutch 212 is configured to rotationally couple a carrier 216 and a ring gear 218 in the differential meshed planet compound planetary gear set 206. In this way, the differential is able to be selectively locked to increase axle performance, particularly in low-traction operating environments (e.g., four wheel drive applications). The differential locking clutch 212 allows the output shafts 242 and 243 (e.g., axle shafts) of the differential meshed planet compound planetary gear set 206 to be selectively locked for rotation with one another. Further, the axle disconnect clutch 214 is configured to selectively decouple the ring gear 218 in the differential meshed planet compound planetary gear set 206 and a ring gear 220 in the mode planetary gear set 204. The axle disconnect clutch 214 allows the differential meshed planet compound planetary gear set 206 to be selectively decoupled from the mode planetary gear set 204. One or both of the differential locking clutch 212 and the axle disconnect clutch 214 may be incorporated into any of the transmissions described herein. The axle disconnect clutch 214 allows vehicle driveline efficiency to be increased for towing, transporting a series of decked vehicles, or if one electric axle in a tandem axle configuration is being used as a tag axle.

Bearings 222 may be coupled to an input shaft 223 of the transmission 202. The input shaft 223 connects the mode planetary gear set 204 and the electric machine 210. As described herein a bearing may include an inner race, roller elements (e.g., cylindrical rollers, spherical balls, tapered cylindrical rollers, needle rollers, bushings, and the like), and an outer race. A bearing 224 is coupled to a sun gear 226 in the mode planetary gear set 204, in the illustrated example. Further, a bearing 228 is coupled to a carrier 230 in the mode planetary gear set. Another bearing 232 is coupled to the carrier 230 and the ring gear 220, in the illustrated example. Further, in the illustrated example, bearings 234 and 246 are coupled to shafts 236 and 248 respectively and/or other suitable mechanical structures which are connected to the ring gears 218 and 220. A bearing 238 may be coupled to the ring gear 218 and the carrier 216, a bearing 240 may be coupled to the output shaft 243 and the carrier 216, and a bearing 244 may be coupled to the carrier 216. The bearings in the transmission may have another suitable arrangement in alternate embodiments.

FIGS. 3A-3D depict different electric machine and gear train arrangements for the input of the mode planetary gear set 204 in different electric axle architectures. The architecture of the mode planetary gear set 204, the differential meshed planet compound planetary gear set 206, the mode clutch 208, the differential locking clutch 212, and the axle disconnect clutch 214 in the transmission 202 are similar to the component architecture and layout shown in FIG. 2. Therefore, redundant description is omitted for concision. Therefore, redundant description of the overlapping components is omitted for brevity.

Figure 3A:
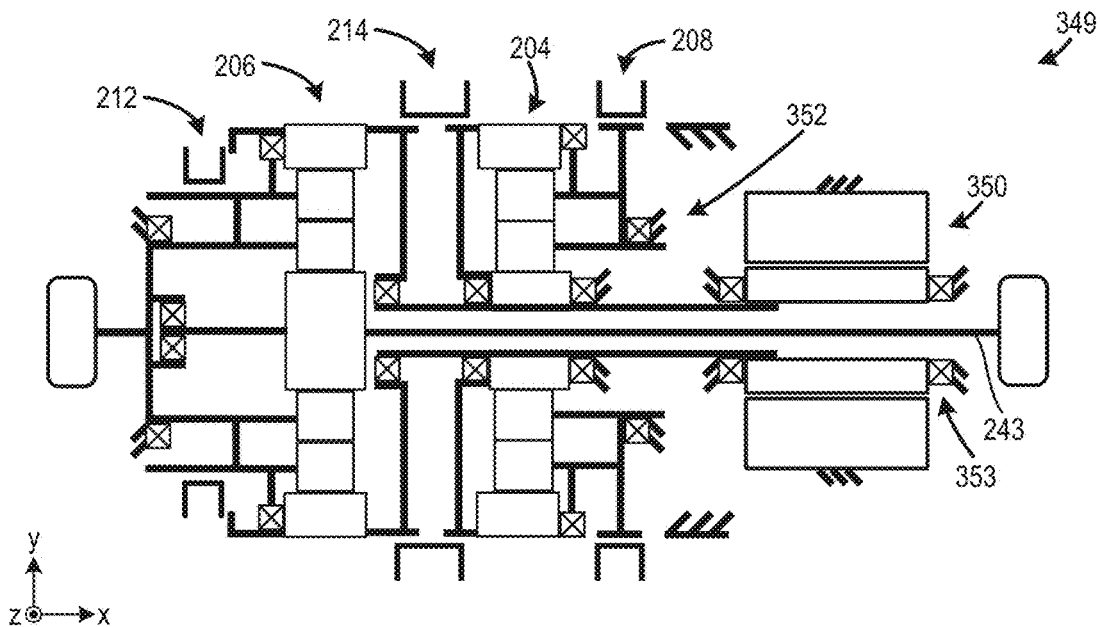
FIGS. 3A-3D show different examples of electric machine and input gear train architectures for the electric axle system depicted in FIG. 2.

FIG. 3A specifically shows an electric axle 349 with an electric machine 350 that is positioned concentric to the output shaft 243 and positioned on an outboard axial side 352 of the mode planetary gear set 204. A portion of one of the output shafts extends through an opening in the electric machine 350, in the illustrated example. In this way, the electric axle's space efficiency is increased. FIG. 3A further shows bearings 353 that are coupled to the electric machine 350. The electric axle includes additional bearings with a layout that is similar to FIG. 2. For instance, generally, rotating shafts and gears have bearings coupled thereto. The other electric axles shown in FIGS. 3B-3D also include a similar bearing layout in the mode planetary gear set 204, the differential meshed planet compound planetary gear set 206, the axle disconnect clutch 214, and the differential locking clutch 212. However, other bearing layouts are possible and at least one of the differential locking clutch 212 and the axle disconnect clutch 214 may be omitted from any of the electric axle architectures shown in FIGS. 2-3D. As indicated above, the axle disconnect clutch 214 and the differential locking clutch 212 may be dog clutches, synchronizers, friction clutches (e.g., wet friction clutches), radial clutches, face clutches, curvic clutches, magnetic clutches, combinations thereof, and the like. Further, the axle disconnect clutch 214 and the differential locking clutch 212 may be actuated via electro-mechanic actuators, pneumatic actuators, hydraulic actuators, electro-magnetic actuators, barrel cam actuators, combinations thereof, and the like. Shift forks, such as translational or rotational shift forks, may specifically be used to actuate at least a portion of the clutches described herein, as previously indicated.

Figure 3B:
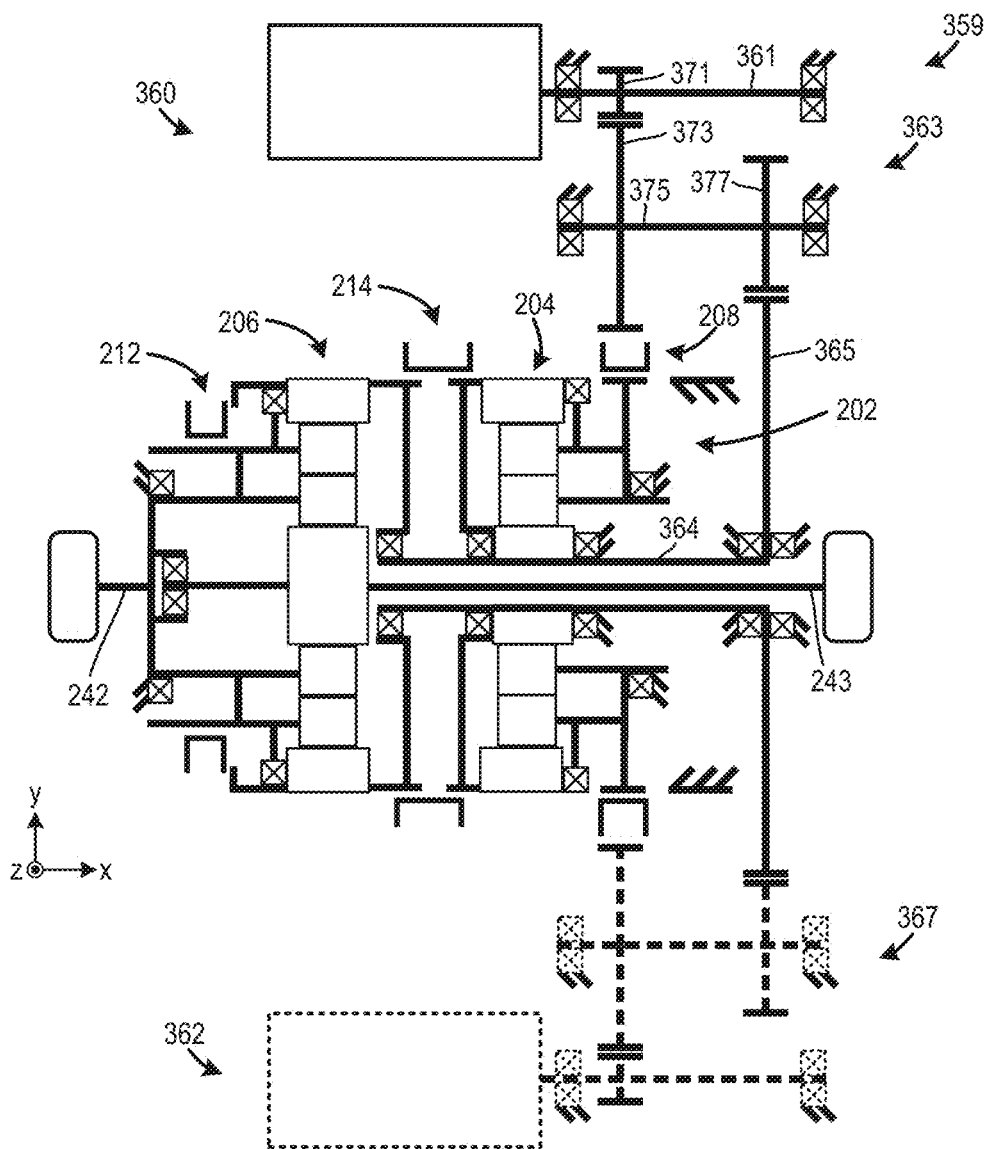

FIG. 3B shows an electric axle 359 with two electric machines 360 and 362 which are each arranged parallel to one of the output shafts 242 and 243 and mechanically attached to the input of the transmission 202 using gear trains 363 and 367. A gear 365 meshes with gears in each of the gear trains 363 and 367 and provides a mechanical connection between a shaft 364 which is rotationally coupled to the input of the mode planetary gear set. The gear train 363 specifically includes a shaft 361 with a gear 371 mounted thereon. The gear 371 meshes with a gear 373 that is mounted on a shaft 375. Another gear 377 is mounted on the shaft 375 and meshed with the gear 365. In this way, two pairs of gears function to rotationally couple the electric machine 360 and the mode planetary gear set. In the illustrated example, the gear train 367 has a similar gear layout. Therefore, redundant description is omitted for concision.

It will be appreciated that the electric machine 362 and corresponding gear train 367 are optional and therefore may be omitted from the electric axle in alternate embodiments. Therefore, in such an example, the electric axle 359 includes the electric machine 360, the gear train 363 with two pair of gears, and the transmission 202.

More generally, a variety of gear train layouts that are connected to the input of the mode planetary gear set may be used. For instance, the gear trains used to connect the first electric machine and/or the second electric machine may include fewer or additional gear passes. In alternate examples, one or more planetary gear sets (e.g., simple planetary gear sets, compound planetary gear sets, and the like) may be used to connect the one or more electric machine(s) to the mode planetary gear set. For instance, a planetary gear set which is coaxial to the electric machine may be used to connect the electric machine to the mode planetary gear set. Additionally or alternatively, a planetary gear set which is positioned coaxial to the rotational axis of the output shafts 242 and 243 may be used to rotationally couple the electric machine to the mode planetary gear set. In any of the embodiments where one or more planetary gear sets provide the input connection for the mode planetary gear set, a carrier in the planetary gear set may be grounded, a ring gear in the planetary gear set may be grounded, or a sun gear in the planetary gear set may be grounded, in different examples. Additional gear passes, chains, belts, combinations thereof, and the like may additionally or alternatively be used to transfer mechanical power between the one or more electric machines to the mode planetary gear set.

Further, it will be understood, that any of the electric axles described herein may include a second electric machine, if desired. For instance, the second electric machine may be coupled to the input of the mode planetary gear set in an identical manner to the mechanical connection formed between the first electric machine and the input of the mode planetary gear set, in one example. In another example, the second electric machine may be coupled to the input of the mode planetary gear set using a different gearing arrangement to allow a different electric machine to mode planetary gear set input ratio, which may allow the second electric machine to have different characteristics than the first electric machine. Additionally, a disconnect clutch may be arranged between the second electric machine and the mode planetary gear set to decouple the second electric machine from the mode planetary gear set to further increase efficiency, in some instances.

Figure 3C:
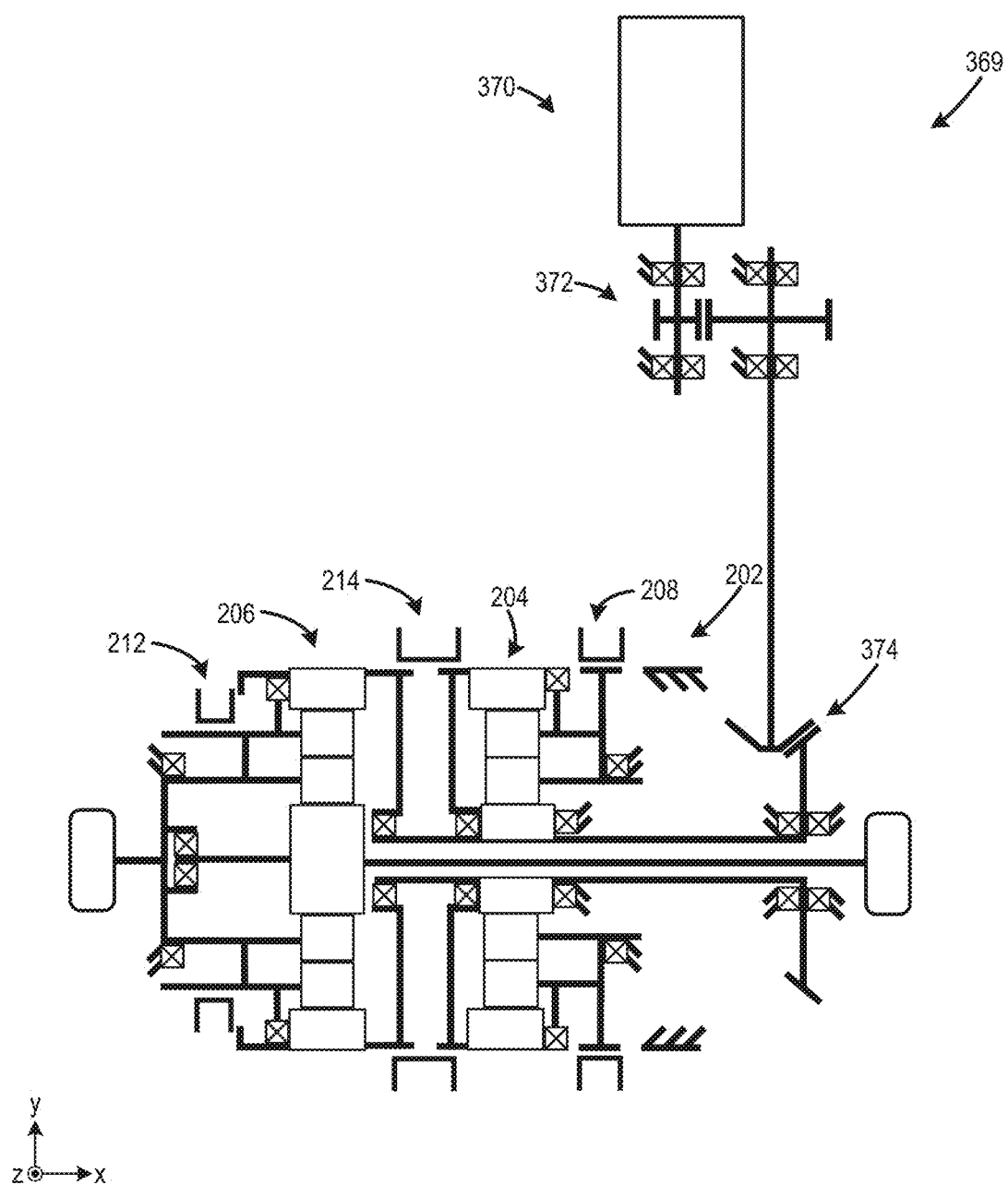

FIG. 3C shows an electric axle 369 with electric machine 370 arranged perpendicular to the rotational axis of the transmission 202. A gear train 372 which includes bevel gears 374 provides input to the mode planetary gear set 204. Similar to exemplary electric axle 359 depicted in FIG. 3B, the addition of a second electric machine, and a second electric machine disconnect clutch has been considered.

Figure 3D:
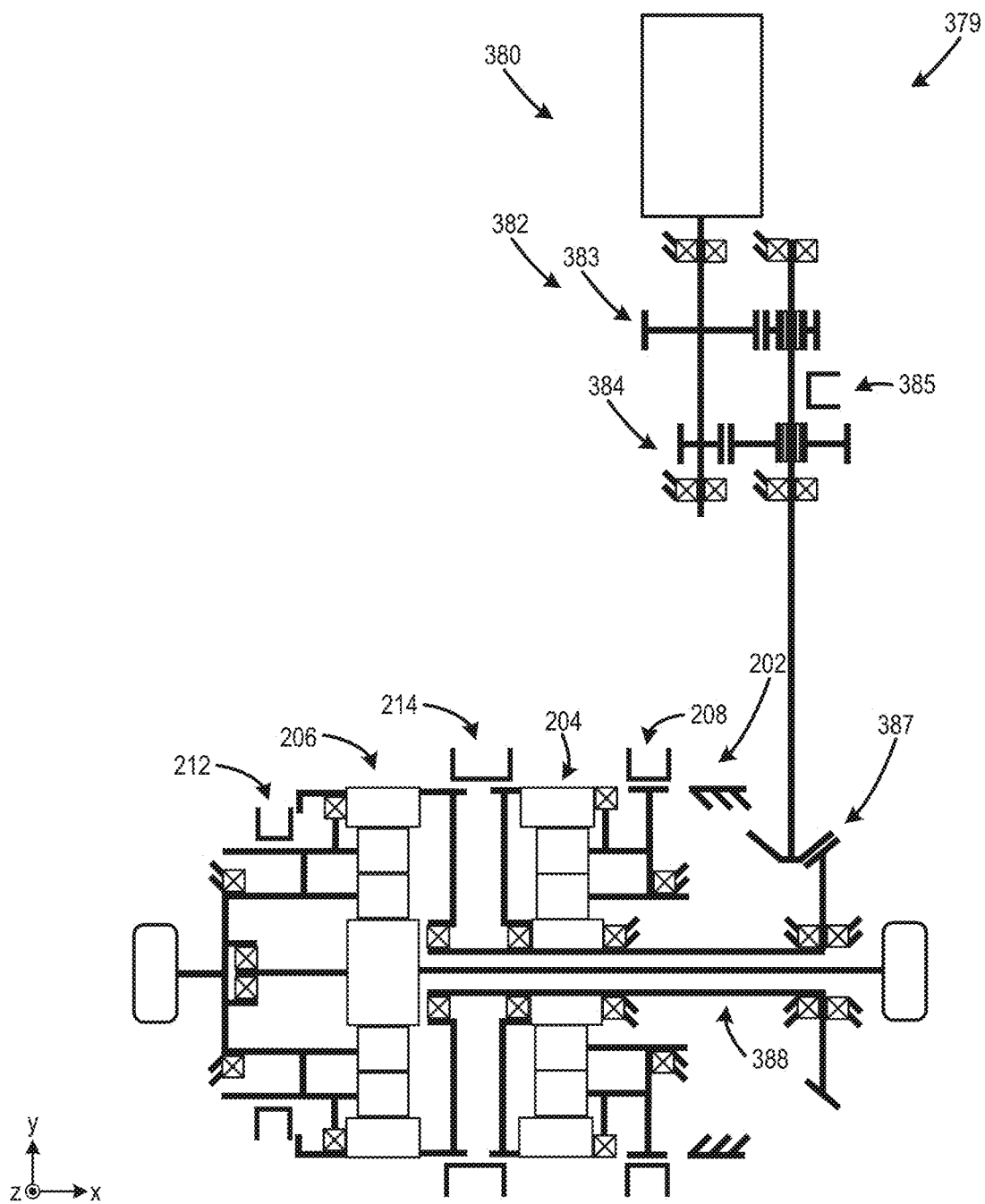

FIG. 3D shows an electric axle 379 with an electric machine 380 arranged perpendicular to the rotational axis of the transmission 202. In the illustrated example, the electric axle includes an input gear train 382 with multiple gear reductions 383 and 384 which are selectable via a clutch 385. In this way, the selectable gearing in the transmission may be further expanded which may allow the electric machine to be more efficiently operated. Similar to exemplary electric axle 359 depicted in FIG. 3B, the addition of a second electric machine, and a second electric machine disconnect clutch has been considered. However, as noted above, a variety of gear train layouts which provide input to the mode planetary gear set have been contemplated. Further, bevel gears 387 are provided in the gear train 382 to connect the gear train to the input shaft 388.

It will be appreciated that electric axles which include combined input gear train and/or motor arrangement features from two or more of FIGS. 2-3D have been envisioned. Further, any of the different motor and/or input gear train arrangements may be used with any of the transmission architectures or combinations of the transmission architecture described herein.

Figure 4:
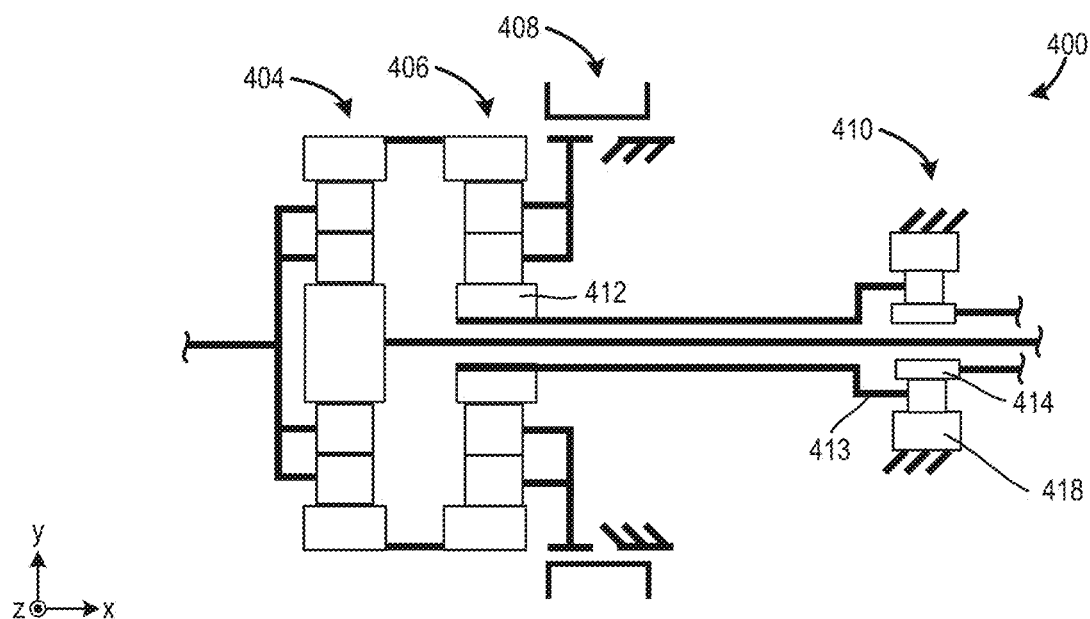
FIGS. 4-7 show different examples of a transmission for an electric axle with a differential meshed planet compound planetary gear set and a mode planetary gear set rotationally coupled to another planetary gear set in different configurations.

FIG. 4 shows another example of a transmission 400 for an electric axle. The transmission 400, in the illustrated example, again includes a differential meshed planet compound planetary gear set 404, a mode planetary gear set 406, and a mode clutch 408. The arrangement of the differential meshed planet compound planetary gear set 404 and the mode planetary gear set 406 are identical to the differential meshed planet compound planetary gear set 105 and the mode planetary gear set 104, shown in FIG. 1A. Therefore, redundant description of the overlapping components is omitted for brevity.

Further, in the example illustrated in FIG. 4, a simple planetary gear set 410 is directly coupled to a sun gear 412 in the mode planetary gear set 406 via a carrier 413. Further, a sun gear 414 of the simple planetary gear set functions as the input of the transmission. Further, a ring gear 418 in the simple planetary gear set is grounded in the example illustrated in FIG. 4. However, alternate simple planetary gear set configurations are possible. For example, in the simple planetary gear set 410, the ring gear 418 may be coupled to the sun gear 412 in the mode planetary gear set 406, and in the simple planetary gear set 410 the carrier 413 may be grounded, and the sun gear 414 of the simple planetary gear set 410 may function as the input of the transmission.

Figure 5:
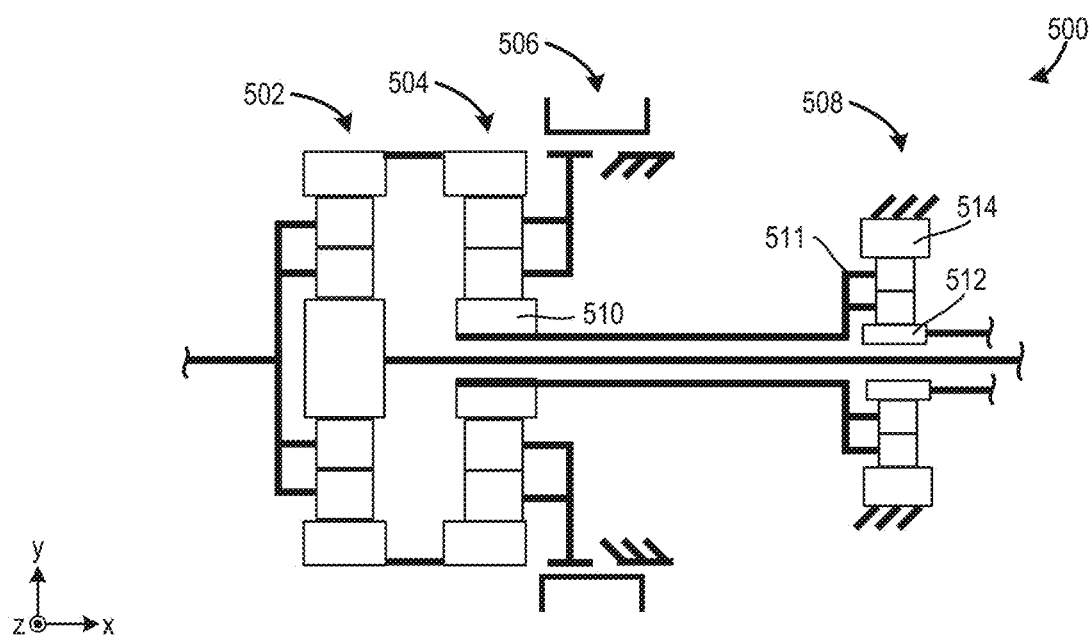

FIG. 5 shows another example of a transmission 500 for an electric axle. The transmission 500, in the illustrated example, includes a differential meshed planet compound planetary gear set 502, a mode planetary gear set 504, and a mode clutch 506, similar to the transmission 102 shown in FIG. 1A. Further, as illustrated in FIG. 5, a meshed planet compound planetary gear set 508 is directly coupled to a sun gear 510 in the mode planetary gear set 504 via a carrier 511. A sun gear 512 of the meshed planet compound planetary gear set 508 functions as the input of the transmission 500. Further, a ring gear 514 in the meshed planet compound planetary gear set 508 is grounded in FIG. 5. However, alternate meshed planet compound planetary gear set configurations are possible. For example, in the meshed planet compound planetary gear set 508, the ring gear 514 may be coupled to the sun gear 510 in the mode planetary gear set 504, and in the meshed planet compound planetary gear set 508 the carrier 511 may be grounded, and the sun gear 512 of the meshed planet compound planetary gear set 508 may function as the input of the transmission.

Figure 6:
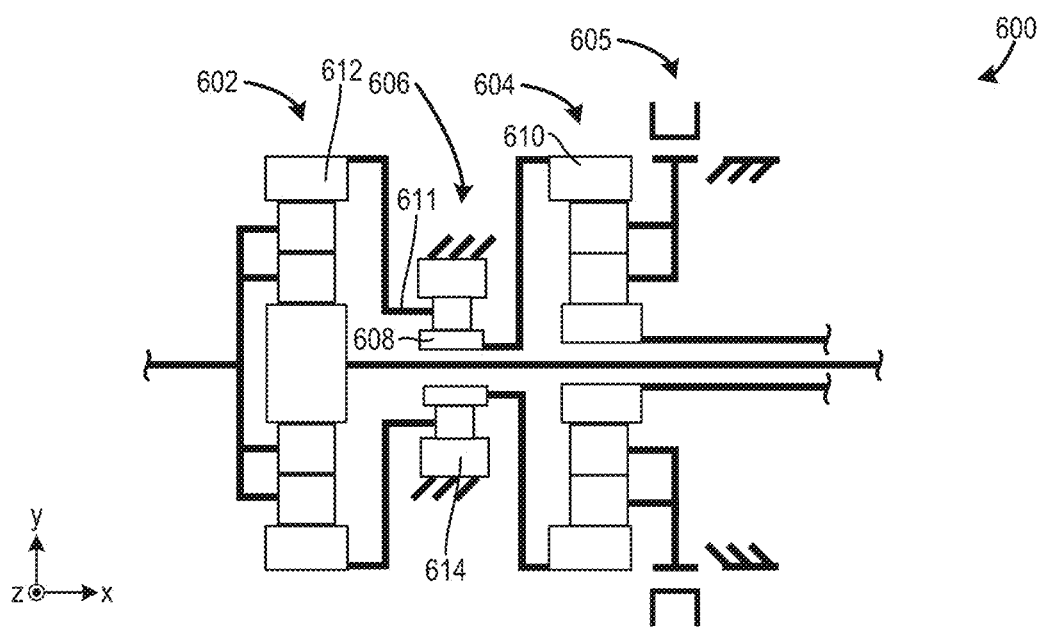

FIG. 6 shows another example of a transmission 600 for an electric axle. The transmission 600, in the illustrated example, again includes a differential meshed planet compound planetary gear set 602 and a mode planetary gear set 604 with a mode clutch 605. However, in the illustrated example, a simple planetary gear set 606 is positioned between the differential meshed planet compound planetary gear set 602 and the mode planetary gear set 604. To expound, in the illustrated example, a sun gear 608 in the simple planetary gear set 606 is rotationally coupled to a ring gear 610 in the mode planetary gear set 604, a carrier 611 in the simple planetary gear set 606 is rotationally coupled to a ring gear 612 in the differential meshed planet compound planetary gear set 602, and a ring gear 614 in the simple planetary gear set 606 is grounded. However, other planetary gear set configurations are possible. For example, in the simple planetary gear set 606, the ring gear 614 may be coupled to the ring gear 612 in the differential meshed planet compound planetary gear set 602, and in the simple planetary gear set 606, the carrier 611 may be grounded, and the sun gear 608 in the simple planetary gear set 606 may be rotationally coupled to a ring gear 610 in the mode planetary gear set 604.

Figure 7:
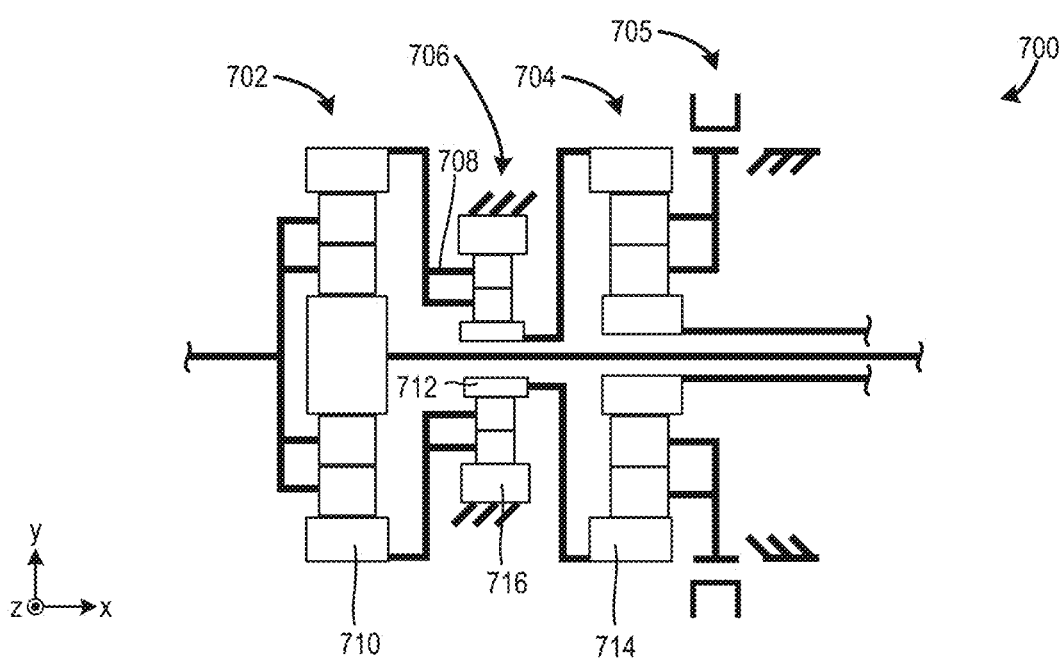

FIG. 7 shows another example of a transmission 700 for an electric axle. The transmission 700, in the illustrated example, again includes a differential meshed planet compound planetary gear set 702 and a mode planetary gear set 704 with a mode clutch 705. The transmission further includes another meshed planet compound planetary gear set 706 with a carrier 708 rotationally coupled to a ring gear 710 in the differential meshed planet compound planetary gear set 702. The meshed planet compound planetary gear set 706 further includes a sun gear 712 rotationally coupled to a ring gear 714 in the mode planetary gear set 704. Additionally, in the illustrated example, a ring gear 716 in the meshed planet compound planetary gear set 706 is grounded. However, other planetary gear set configurations are possible, as previously indicated. For example, in the meshed planet compound planetary gear set 706, the ring gear 716 may be coupled to the ring gear 710 in the differential meshed planet compound planetary gear set 702, and in the meshed planet compound planetary gear set 706, the carrier 708 may be grounded, and the sun gear 712 in the meshed planet compound planetary gear set 706 may be rotationally coupled to a ring gear 714 in the mode planetary gear set 704. It will be appreciated that the transmissions shown in FIGS. 4-7 as well as the other transmissions described herein may include axle disconnect clutches and/or differential locking clutches.

Figure 8:
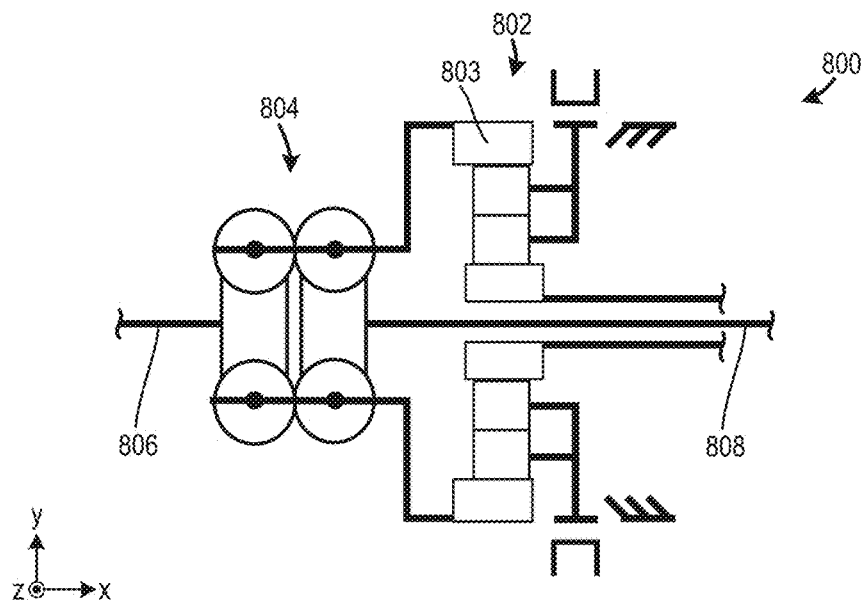
FIG. 8 shows another example of an electric axle with a mode planetary gear set and a limited slip differential.

FIG. 8 shows another example of a transmission 800 for an electric axle. The transmission 800, in the illustrated example, contains a mode planetary gear set 802. However, in the illustrated example, a ring gear 803 in the mode planetary gear set 802 is rotationally coupled to a limited slip differential 804 that is configured to constrain the speed differentiation between the output shafts 806 and 808 using a clutch, friction, bias ratios and/or other suitable devices and methods.

Figure 9:
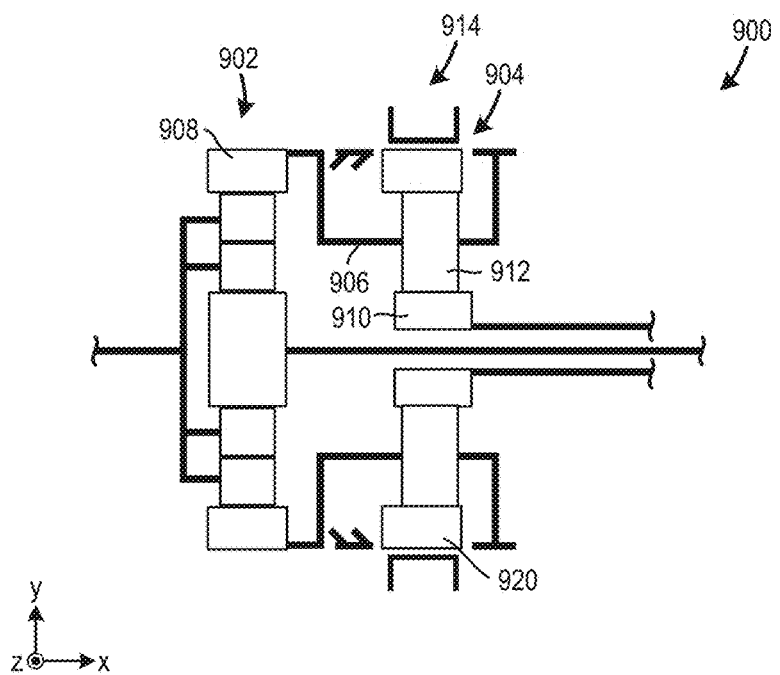
FIG. 9 shows another example of an electric transmission with a multi-speed mode planetary gear set and a differential meshed planet compound planetary gear set.

FIG. 9 shows another example of a transmission 900 for an electric axle. The transmission 900, in the illustrated example, again includes a differential meshed planet compound planetary gear set 902. The transmission 900 also includes a mode planetary gear set 904 with a different architecture than the previously described mode planetary gear sets. To expound, the mode planetary gear set 904 includes a carrier 906 that is rotationally coupled to a ring gear 908 in the differential meshed planet compound planetary gear set 902. Further, a sun gear 910 in the mode planetary gear set 904 which meshes with a set of planetary gears 912 functions as the input of the mode planetary gear set 904. Further, a mode clutch 914 is configured to ground the ring gear 920 which meshes with gears in the set of planetary gears 912 in a first mode and rotationally couple the ring gear 920 and the carrier 906 in a second mode.

Figure 10:
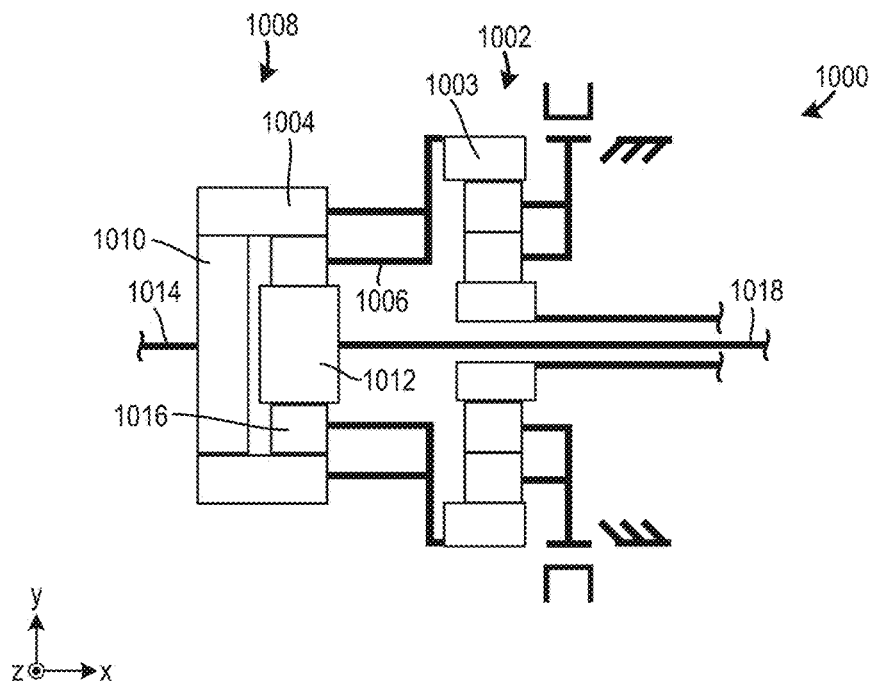
FIG. 10 shows another example of an electric axle with a mode planetary gear set and a dual sun gear differential.

FIG. 10 shows another example of a transmission 1000 for an electric axle. The transmission 1000, in the illustrated example, again includes a mode planetary gear set 1002. However, in the illustrated example, a ring gear 1003 in the mode planetary gear set 1002 is rotationally coupled to a carrier 1006 in a dual sun differential 1008. In the illustrated example, the dual sun differential 1008 further includes a first sun gear 1010 and a second sun gear 1012 that are coupled to output shafts 1014 and 1018 respectively. Planet gears 1004 mesh with planet gears 1016 and sun gear 1010, and planet gears 1016 mesh with sun gear 1012. Planet gears 1004 and 1016 are rotatably mounted to carrier 1006. The dual sun differential may be an open differential or may be a limited slip differential that is configured to constrain the speed differentiation between the output shafts 1014 and 1018 using a clutch, friction, bias ratios and/or other suitable device and methods. It will be understood, that the mode planetary gear sets described herein may be coupled to other types of differentials such as locking differentials, open differentials, and the like.

Figure 11:
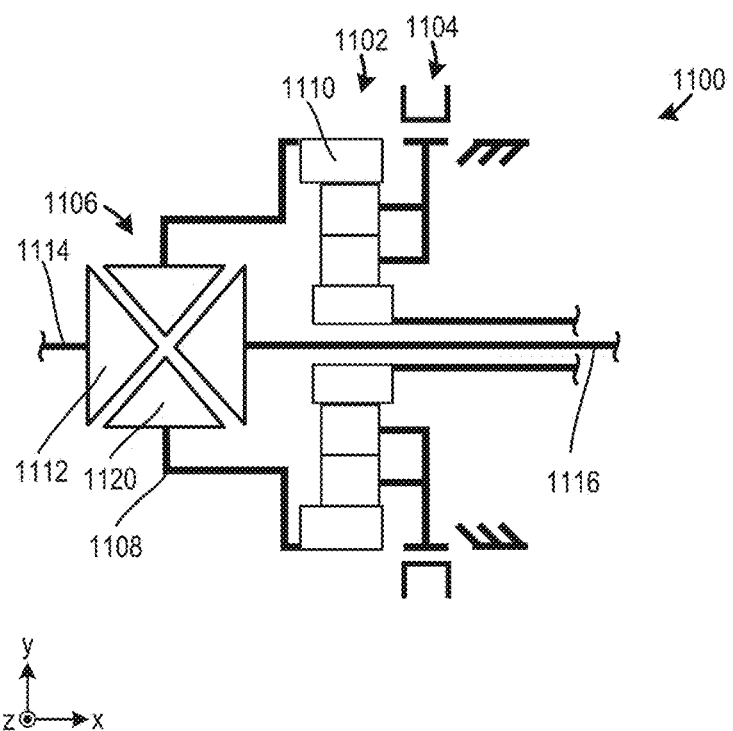
FIG. 11 shows another example of an electric axle with a mode planetary gear set and an open differential.

FIG. 11 shows another example of a transmission 1100 for an electric axle. The transmission 1100 again includes a mode planetary gear set 1102 with a mode clutch 1104. The transmission 1100 further includes an open differential 1106 with a differential carrier 1108 that is driven by a ring gear 1110 in the mode planetary gear set 1102. The differential 1106 further includes differential pinions 1120 (which may be referred to as spider gears) which are rotatably mounted to the differential carrier 1108 and are in mesh with side gears 1112 (which may be referred to as sun gears). The side gears 1112 are rotationally coupled to output shafts 1114 and 1116. Further, it will be understood that the differential 1106 (shown in FIG. 11) as well as the differentials shown in FIGS. 8 and 10 are examples of dual sun gear differentials.

Furthermore, it will be appreciated that the differentials described in FIGS. 1A-11 may further be combined with springs, clutches or cones, cam ramps, helical gears, worm gears, spur gears, viscous couplings, gerotors, and electronic components to create a limited slip differential (LSD) (e.g., a torque sensing limited slip differential), an automatic torque biasing (ATB) limited slip differential, a clutch pack style limited slip differential, a bevel gear differential, a dual sun differential, a reduction differential, and the like.

The output shafts in the electric axles described herein may be directly coupled to drive wheels, wheel end gear reductions (e.g., planetary gear reductions in the wheel hubs), or other suitable mechanical components in applications that demand a differential output in vehicles (e.g., cars, trucks, boats, ATVs, commercial vehicles, light vehicles, off-highway vehicles, mining vehicles, rail vehicles, and the like) as well as other applications (e.g., manufacturing applications such as manufacturing machinery, industrial applications such as industrial machinery, and the like). When the electric axles described herein are used in vehicles, it will be appreciated that the transmissions may be used as trans-axles in electric vehicles (EVs) such as all-electric vehicles (e.g., battery electric vehicles (BEVs)) and hybrid electric vehicles. As such, the vehicles that utilize the transmissions described herein may have an internal combustion engine (e.g., a spark ignition engine, a compression ignition engine, combinations thereof, and the like), in some examples. Further, the electric axles described herein may have axle disconnect and/or differential locking functionality.

Gearing in the planetary gear sets described herein may have spur or helical profiles. As described above, the second motors in the electric axles described herein are optional. Further, in one example, the gearing used to mechanically couple the motors to the transmission input may be identical and engage a final gear on the output centerline. In another example, the gearing associated with the second motor may be different from the gearing associated with the first motor and engage the final gear on the output centerline. Further, in one example, the gearing associated with the second motor may include a clutch to decouple the second electric machine from the mode planetary gear set to further increase efficiency, in some instances.

Still further, in one example, the gearing associated with the second motor may engage the gearing associated with the first motor prior to the final gear on the output centerline. Even further in one example, the gearing associated with the second motor may have a different ratio and engage the gearing associated with the first motor prior to the final gear on the output centerline.

Further, the two speed planetary gear sets shown in FIGS. 1A-11 may have a 1:1 ratio in one of the modes, in one use-case example. However, the electric axle may have a variety of ratios which may be selected based on the end-use design goals of the vehicle platform. As such, the ratios illustrated in the FIGS. 1A-11 are use-case ratios and different ratios may be used in the electric axles.

Further, the exact location and number of the bearings in the electric axle architectures illustrated in the FIGS. 2-3D is suggestive and exemplary in nature and it will be understood that alternate bearing layouts, types, quantities, etc. may be used, in alternate examples.

Further, it will be understood that the electric axles may utilize one or more transverse motors which may be coupled to the transmission's input via hypoid gears or other suitable bevel or spiral gears. In such an example, the motor may be engaged to the hypoid gear with a mating pinion, and between the motor and pinion there could be other gear passes and/or shiftable gears. Shiftable gears may be positioned on either parallel mating shaft, in different examples. Further, additional gear passes may be added to the electric axles, if desired. Still further, the planetary gear sets described herein may take the form of simple planetary gear sets, meshed planet compound planetary gear sets, stepped planet compound planetary gear sets, and/or magnetic planetary gear sets.

Further, it will be appreciated that the various motor arrangements illustrated in FIGS. 2-3D may be used in any of the electric axles described herein such as any of the electric axles shown in FIGS. 1A and 4-11 or combinations of the electric axles. Further, different combinations of the motor architectures and the transmission architectures that include multiple features from separate embodiments have been envisioned.

The invention will be further described in the following paragraphs. In one aspect, an electric axle system is provided that comprises an electric machine; and a multi-speed transmission rotationally coupled to the electric machine, rotationally coupled to two output shafts, and including: a differential rotationally coupled and positioned coaxial to a mode planetary gear set; and a mode clutch configured to selectively shift the mode planetary gear set into: a first mode where the mode clutch grounds a carrier or a ring gear that are included in the mode planetary gear set; and a second mode where the mode clutch rotationally couples the carrier to the ring gear. In one example, the mode planetary gear set may be a meshed planet compound planetary gear set; and/or the differential may be a differential meshed planet compound planetary gear set. Further, in one example, the ring gear in the mode planetary gear set may be rotationally coupled to the differential and a sun gear in the mode planetary gear set may be rotationally coupled to an upstream component that receives mechanical power from the electric machine. In one example, the electric axle system may further comprise a differential locking clutch configured to selectively rotationally couple a ring gear in the differential to a carrier in the differential to lock rotation of the two output shafts. Further, in one example, a sun gear in the differential meshed planet compound planetary gear set may be rotationally coupled to a first output shaft in the two output shafts, and a carrier in the differential meshed planet compound planetary gear set may be rotationally coupled to a second output shaft in the two output shafts. Further, in one example, the electric axle system may further comprise an axle disconnect clutch configured to selectively disconnect the differential from the mode planetary gear set. In another example, the electric machine may be positioned coaxial, parallel, or transverse to the mode planetary gear set and the differential. In yet another example, the mode clutch may be a dog clutch. In another example, the electric axle system may further comprise a simple planetary gear set rotationally coupled to the mode planetary gear set and the differential. In another example, the electric axle system may further comprise a meshed planet compound planetary gear set rotationally coupled to the mode planetary gear set and the differential.

In another aspect, a method for operation of an electric axle system is provided that comprises operating a mode clutch to: in a first mode, ground a carrier or a ring gear in a mode planetary gear set; in a second mode, rotationally couple the carrier and the ring gear in the mode planetary gear set; wherein the electric axle system includes: an electric machine; a multi-speed transmission rotationally coupled to the electric machine, rotationally coupled to two output shafts, and including: the mode planetary gear set rotationally coupled and positioned coaxial to a differential; and the mode clutch; wherein the mode planetary gear set is a meshed planet compound planetary gear set. In one example, the differential may be a differential meshed planet compound planetary gear set; the ring gear in the mode planetary gear set may be rotationally coupled to a ring gear in the differential meshed planet compound planetary gear set; and a sun gear and a carrier in the differential meshed planet compound planetary gear set may be rotationally coupled to separate output shafts. In one example, the method may further comprise operating a differential locking clutch to rotationally couple a ring gear in the differential to a carrier in the differential to lock rotation of the two output shafts. In one example, the method may further comprise operating an axle disconnect clutch to selectively disconnect the mode planetary gear set from the differential.

In another aspect, an electric axle system is provided that comprises an electric machine; and a multi-speed transmission rotationally coupled to the electric machine and including: a mode planetary gear set rotationally coupled and positioned coaxial to a differential meshed planet compound planetary gear set; and a mode clutch configured to selectively shift the mode planetary gear set into a first mode and a second mode. In one example, the mode planetary gear set may include a first ring gear that is rotationally coupled to a second ring gear in the differential meshed planet compound planetary gear set. In another example, the mode clutch may be configured to shift the mode planetary into: the first mode where the mode clutch grounds a carrier or a ring gear that is included in the mode planetary gear set; and in the second mode where the mode clutch may rotationally couple the carrier to the ring gear in the mode planetary gear set. In one example, the electric axle system may further comprise a differential locking clutch configured to selectively rotationally couple a ring gear in the differential meshed planet compound planetary gear set to a carrier in the differential meshed planet compound planetary gear set to lock rotation of two output shafts; and an axle disconnect clutch configured to selectively disconnect the mode planetary gear set from the differential meshed planet compound planetary gear set. In another example, a sun gear in the differential meshed planet compound planetary gear set may be rotationally coupled to a first output shaft; and a carrier in the differential meshed planet compound planetary gear set may be rotationally coupled to a second output shaft. In another aspect, the electric machine and the mode planetary gear set may be coaxially arranged.

In another representation, an electric axle system is provided that comprises an electric machine; and a multi-speed transmission rotationally coupled to the electric machine via at least two pairs of gears, rotationally coupled to two output shafts, and including: a differential rotationally coupled and positioned coaxial to a mode planetary gear set; wherein the mode planetary gear set is a meshed planet compound planetary gear set.

FIGS. 1A-11 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

Motor and shift control logic/programs, inverters, electronic control units (ECUs), memory storage, throttle, brake, speed, and inclination sensors and the like, shift actuators, etc. may further be used in any of the electric axles and transmissions described herein.

FIGS. 1A-11 provide for a method for electric axle operation wherein the transmission shifts between the two modes based on vehicle operating conditions. The method may further selectively lock the differential via operation of a differential locking clutch in the differential. The method may even further include, selectively disconnecting the axle via operation of an axle disconnect clutch.

Further, the axles and transmissions described herein may include control systems that include a controller with a processor and memory that stores instructions for carrying out the method steps described herein. To elaborate, the control methods and routines disclosed herein may be stored as executable instructions in non-transitory memory and may be carried out by a system including the controller in combination with the various sensors and actuators. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the system, where the described actions are carried out by executing the instructions in a system including the various hardware components in combination with the electronic controller. One or more of the method steps described herein may be omitted if desired.

While various embodiments have been described above, it should be understood that they have been presented by way of example, and not limitation nor restriction. It will be appreciated that the configurations and routines disclosed herein are exemplary in nature, and that these specific examples are not to be considered in a limiting sense, because numerous variations are possible. For example, the above technology can be applied to powertrains that include different types of propulsion sources including different types of electric machines, internal combustion engines, and/or transmissions. The technology may be used as a stand-alone, or used in combination with other power transmission systems not limited to machinery and propulsion systems for tandem axles, electric tag axles, P4 axles, EVs (e.g., HEVs, BEVs, etc.), agriculture vehicles or machines, marine vehicles or machines, motorcycles, recreational vehicles, and on and off highway vehicles, mining vehicles, rail vehicles, manufacturing machinery, industrial machinery, and the like, as an example. The subject matter of the present disclosure includes all novel and non-obvious combinations and sub-combinations of the various systems and configurations, and other features, functions, and/or properties disclosed herein. It will be apparent to persons skilled in the relevant arts that the disclosed subject matter may be embodied in other specific forms without departing from the spirit of the subject matter.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electric axle system, comprising:
an electric machine; and
a multi-speed transmission rotationally coupled to the electric machine, rotationally coupled to two output shafts, and including:
a differential rotationally coupled to a mode planetary gear set;
a mode clutch configured to selectively shift the mode planetary gear set into:
a first mode where the mode clutch grounds a carrier or a ring gear that are included in the mode planetary gear set; and
a second mode where the mode clutch rotationally couples the carrier to the ring gear; and
an axle disconnect clutch configured to selectively disconnect the differential from the mode planetary gear set;
wherein a rotational axis of the differential is arranged coaxial to a rotational axis of the mode planetary gear set.

2. The electric axle system of claim 1, wherein:
the mode planetary gear set is a meshed planet compound planetary gear set; and
the differential is a differential meshed planet compound planetary gear set.

3. The electric axle system of claim 2, wherein the ring gear in the mode planetary gear set is directly rotationally coupled to the differential and a sun gear in the mode planetary gear set is rotationally coupled to an upstream component that receives mechanical power from the electric machine.

4. The electric axle system of claim 3, wherein a sun gear in the differential meshed planet compound planetary gear set is rotationally coupled to a first output shaft in the two output shafts, and a carrier in the differential meshed planet compound planetary gear set is rotationally coupled to a second output shaft in the two output shafts.

5. The electric axle system of claim 1, further comprising a differential locking clutch configured to selectively rotationally couple a ring gear in the differential to a carrier in the differential to lock rotation of the two output shafts.

6. The electric axle system of claim 1, wherein the electric machine is positioned coaxial, parallel, or transverse to the mode planetary gear set and the differential.

7. The electric axle system of claim 1, wherein the mode clutch is a dog clutch.

8. A method for operation of an electric axle system, comprising:
operating a mode clutch to:
in a first mode, ground a carrier or a ring gear in a mode planetary gear set;
in a second mode, rotationally couple the carrier and the ring gear in the mode planetary gear set; and
operating an axle disconnect clutch to selectively disconnect the mode planetary gear set from the differential;
wherein the electric axle system includes:
an electric machine;
a multi-speed transmission rotationally coupled to the electric machine, rotationally coupled to two output shafts, and including:
the mode planetary gear set rotationally coupled and positioned coaxial to a differential; and
the mode clutch;
wherein the mode planetary gear set is a meshed planet compound planetary gear set.

9. The method of claim 8, wherein:
the differential is a differential meshed planet compound planetary gear set;
the ring gear in the mode planetary gear set is rotationally coupled to a ring gear in the differential meshed planet compound planetary gear set; and
a sun gear and a carrier in the differential meshed planet compound planetary gear set are rotationally coupled to separate output shafts.

10. The method of claim 8, further comprising operating a differential locking clutch to rotationally couple a ring gear in the differential to a carrier in the differential to lock rotation of the two output shafts.

11. An electric axle system, comprising:
an electric machine;
a multi-speed transmission rotationally coupled to the electric machine and including:
a mode planetary gear set rotationally coupled and positioned coaxial to a differential meshed planet compound planetary gear set;
a mode clutch configured to selectively shift the mode planetary gear set into a first mode and a second mode;
a differential locking clutch configured to selectively rotationally couple a ring gear in the differential meshed planet compound planetary gear set to a carrier in the differential meshed planet compound planetary gear set to lock rotation of two output shafts; and
an axle disconnect clutch configured to selectively disconnect the mode planetary gear set from the differential meshed planet compound planetary gear set.

12. The electric axle system of claim 11, wherein the mode planetary gear set includes a first ring gear that is rotationally coupled to a second ring gear in the differential meshed planet compound planetary gear set.

13. The electric axle system of claim 11, wherein the mode clutch is configured to shift the mode planetary into:
   the first mode where the mode clutch grounds a carrier or a ring gear that is included in the mode planetary gear set; and
   in the second mode where the mode clutch rotationally couples the carrier to the ring gear in the mode planetary gear set.

14. The electric axle system of claim 11, wherein:
   a sun gear in the differential meshed planet compound planetary gear set is rotationally coupled to a first output shaft; and
   a carrier in the differential meshed planet compound planetary gear set is rotationally coupled to a second output shaft.

15. The electric axle system of claim 11, wherein the electric machine and the mode planetary gear set are coaxially arranged.

* * * * *